July 2, 1940.　　　　W. R. KOCH　　　　2,206,637
DIRECTION INDICATING RADIO RECEIVER
Filed Aug. 14, 1937
FIG-1
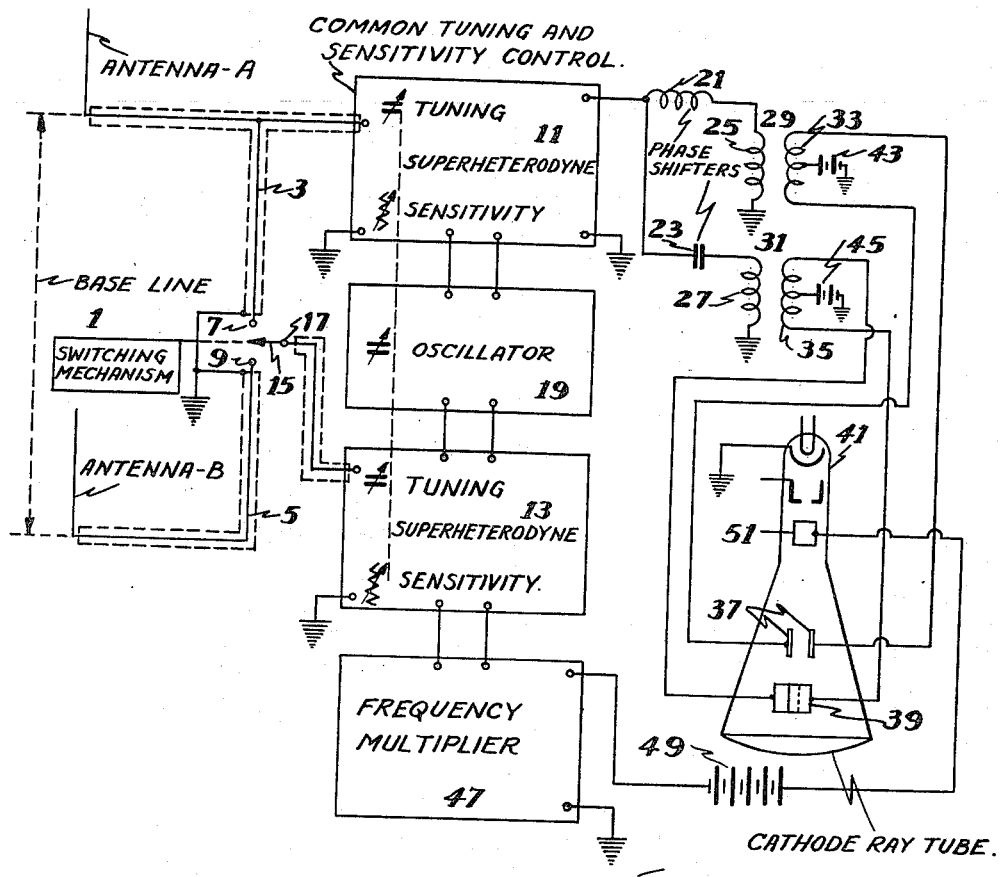
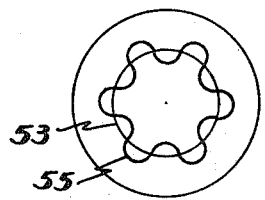
FIG-2
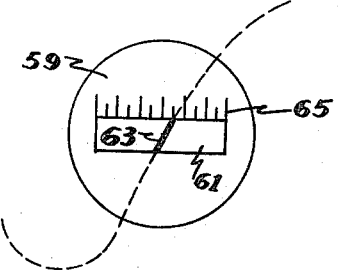
FIG-3
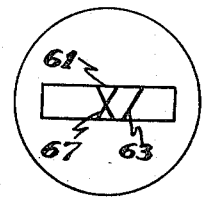
FIG-4
Inventor
Winfield R. Koch.
By
Attorney Patented July 2, 1940

2,206,637

UNITED STATES PATENT OFFICE 2,206,637

DIRECTION INDICATING RADIO RECEIVER

Winfield R. Koch, Merchantville, N. J., assignor to Radio Corporation of America, a corporation of Delaware Application August 14, 1937, Serial No. 159,037

9 Claims. (Cl. 250—11)

My invention relates to direction indicating radio receivers. More specifically, my invention is a radio receiver which indicates the direction of a radio transmitter by indicating the differences in phase of the transmitted waves as its front reaches a pair of spaced antennas.

I am aware that loop antennas have been used for direction indication. Directional indication by loop reception depends, for accurate indication, upon placing the loop in a position of minimum or zero response. The use of a minimum signal is not always desirable. By way of example, zero or minimum signals in the presence of static are very difficult to detect.

In place of a balanced loop, I propose to provide means for detecting the difference in phase of a radio wave as it approaches a pair of spaced antennas which intercept the approaching wave front at different times. If two antennas are spaced thirty feet apart on a base line, and if one antenna is one foot nearer a remote radio transmitter than the other antenna, a horizontal line normal to the base line will have a bearing of about two degrees off the horizontal line from the base to the transmitter. If the transmitter is operating at a frequency of one thousand kilocycles per second, and one antenna is one foot nearer the transmitter than the other, the phase difference of the currents in the antennas will be approximately 0.36 degree. A cathode ray tube may be used to indicate phase differences of the order of 0.36 degree, as will be hereinafter set forth.

One of the objects of my invention is to provide means for indicating the bearing of a radio transmitter from a radio receiver.

Another object is to provide means for indicating the phase of a radio wave front at different bearings from the transmitter.

A further object is to indicate the relative phases of the currents induced in a pair of antennas by a wave from a remote radio transmitter by means of a cathode ray tube.

A still further object is to indicate on a cathode ray tube the departure from an in-phase condition of currents induced in a pair of spaced antennas.

An understanding of my invention may be best had by referring to the accompanying drawing in which Figure 1 is a schematic diagram of one embodiment of my invention, and Figures 2, 3 and 4 are illustrations of the cathode ray patterns which are used to indicate phasal relations between two currents.

Referring to Fig. 1, a pair of vertical antennas A and B are spaced along a horizontal base line 1. The antennas A and B are connected through shielded lead wires 3, 5 to switch points 7, 9. The antenna A is also connected directly to a superheterodyne receiver 11. A second superheterodyne receiver 13 is connected to the switch blade 15 of a switch 17. A common oscillator 19 is connected to both receivers 11 and 13. The output of the first receiver 11 is connected to phase shifters 21, 23. The first phase shifter 21 is adjusted to provide a 45 degree lagging current; the second phase shifter 23 advances the current 45 degrees. The total phase shift is 90 degrees.

The phase shifters 21, 23 are connected to the primaries 25, 27 of transformers 29, 31. The secondaries 33, 35 of the transformers 29, 31 are connected to opposite pairs of deflecting electrodes 37, 39 of a cathode ray tube 41. The electrodes may be biased by batteries 43, 45 or the like. The currents applied to the deflecting electrodes deflect the cathode ray over a curved or circular path.

The output circuit of the second receiver 13 is connected to a frequency multiplier 47. The function of the multiplier, as the same implies, is to increase the applied frequency. By way of example, the multiplication factor I have chosen is six. The output from the frequency multiplier is connected through a biasing battery 49 to the second anode 51 of the cathode ray tube 41. The remaining cathode ray electrodes are connected to suitable current sources in the manner well known to those skilled in the art. The function of the applied multiplied frequency currents is to vary or modulate the circular trace of the cathode ray to produce a gear shape trace. The number of "gear teeth" modulations depends on the multiplication factor.

The operation of the system is as follows: The two receivers are each tuned to the carrier wave of the transmitter whose direction is to be determined. If the first receiver 11 is then operated, with the second receiver disconnected from the antenna, the cathode ray trace will be a circle 53 as illustrated in Fig. 2, provided the phase shifting circuits are supplying currents which are 90° apart and hence applying a rotating deflecting field. If the second receiver 13 is connected to antenna A, and the frequency multiplier adjusted to multiply the radio frequency by six, the circular pattern 53 will be modulated or modified and will appear as a gear shape pattern 55. The pattern will appear steady.

If the second receiver 13 is disconnected from antenna A and connected to antenna B, no change will appear if the phase of the currents in antenna B are the same as the phase of the currents in the antenna A. If the currents in antenna B have a different phase from the currents in antenna A, the gear shape pattern will rotate to left or right, as the phase may lead or lag, to a new steady position. If the phase of the currents is the same, as will be indicated by the gear shape pattern remaining stationary as the switch blade 15 is shifted from contact 7 to contact 9, it follows that the base line is parallel to the wave front. The transmitter bearing lies along a horizontal line normal to the base line. The amount of phase shift indicated by the cathode ray is an indication of the bearing of the transmitter with respect to the base line.

Instead of viewing the cathode ray trace or pattern as a whole as shown in Fig. 2, I prefer to apply biases to the cathode ray electrodes which will greatly enlarge the pattern so that only a portion of a gear tooth trace is shown on the cathode ray screen as indicated in Fig. 3. The screen may be covered by a mask 59 which includes a slit 61 through which the slanting line 63 portion of the trace is visible. The mask may include a scale 65.

The zero phase position may be determined by connecting both receivers 11 and 13 to the single antenna A. Under these conditions there will be zero phase shift; therefore the line 63 will be stationary and will indicate the zero position. If the receiver 13 is connected to the antenna B and the line 63 changes its position, it will indicate that the base line 13 is not normal to the approaching wave front because the currents in the two antennas have a phase difference. If the antennas are rotated in a horizontal plane about their common center, the phase of the currents induced in the antennas by the waves from the transmitter may be adjusted to indicate zero phase shift. Such indication shows that the base line through the antenna is parallel to the wave front and that the bearing of the transmitter is normal to the base line.

The zero line may be continuously indicated by switching from a single antenna to two antennas at a frequency of the order of twenty-five times per second. Such switching may be done manually, mechanically or electrically. If it is desired to identify the zero line with respect to the phase indicating line, the voltage applied to the second anode may be reversed 180° in phase during alternate times that the two receivers are connected to the single antenna. The zero identification will then be a crossed line 67, as shown in Fig. 4.

It will be observed that the phase of the antenna currents is a function of the relative distances of the antennas from the transmitter, and the length of the transmitted wave. Therefore the phase shift in degrees or the bearing of the transmitter in degrees, may be determined by applying a correction factor to the indicated phase shift for each frequency. Instead of applying correction factors, I prefer to vary the sensitivity of the receivers simultaneously with the tuning and thereby vary the position of the trace to correctly and directly indicate the phase or transmitter bearing.

If the length of the transmitted wave is short compared to the distance between the antennas, it will be apparent that for some angular positions of the base line with respect to the wave front, the phase of successive waves may be determined instead of the phases of the same wave. This would lead to an incorrect indication of the bearing of the transmitter. I prefer to avoid this difficulty by using wave lengths greater than the base length. If superheterodyne receivers are used, I prefer to heterodyne to high frequencies rather than lower frequencies because the phase difference in degrees increases as the frequency increases.

I claim as my invention:

1. A directional radio receiving system including, in combination, a pair of antennas, a pair of radio receivers, means connecting said receivers to said antennas, means for deriving currents differing in phase by 90° from one of said receivers, means for multiplying the frequency output currents of the other of said receivers, a phase indicating device, means for applying said multiplied frequency output currents and said 90° phased currents to said device for indicating the relative phase of the currents in said antennas.

2. A direction determining radio receiver including, in combination, a pair of spaced antennas, a pair of radio receivers, means connecting one of said receivers to one of said antennas, a selectively operable switch for connecting the other of said radio receivers to one or the other of said antennas, and means connected to the outputs of said radio receivers for indicating changes in phase of the currents in said two antennas as said second mentioned receiver is connected to first one, then the other, of said antennas.

3. A direction determining radio system including a pair of antennas, a pair of radio receivers, means for connecting one of said radio receivers to one of said antennas, a selectively operable switch for connecting the other of said receivers to one or the other of said antennas, a cathode ray tube including deflecting electrodes, means connected to the output of said first mentioned receiver and to said deflecting electrodes to move said cathode ray over a circular pattern, means connected to the output of said second mentioned receiver for making said circular pattern gear shape, and means including said cathode ray for indicating changes in phase of currents induced in said antennas.

4. A direction determining radio receiver including, in combination, a pair of spaced antennas, a pair of radio receivers, means connecting one of said receivers to one of said antennas, a selectively operable switch for connecting the other of said radio receivers to one or the other of said antennas, a cathode ray tube including deflecting electrodes, means connected to said electrodes and to the output of said receivers whereby said ray is deflected over a modulated circular pattern, and means for indicating on said path the phase of currents derived in one and then both of said antennas.

5. In a device of the character of claim 4, means for identifying the cathode ray deflection pattern for the currents derived from said one of said antennas.

6. A direction-determining radio receiving system including, in combination, a pair of spaced antennas, a pair of radio receivers having tuning and sensitivity controls, means for connecting one of said receivers to one of said antennas, a selectively operable switch for connecting the other of said receivers to either of said antennas, a calibrated phase-indicating device connected to the outputs of said receivers, and means operably connecting said tuning and sensitivity controls to thereby compensate for changes in calibration of said indicating device caused by changes in operating frequency.

7. A direction-determining radio receiving system including, in combination, a pair of spaced antennas, a pair of radio receivers, means connecting one of said receivers to one of said antennas, an automatically selectively operable switch for connecting the other of said radio receivers from one to the other of said antennas, means connected to the outputs of said receivers for indicating in-phase antenna currents when said receivers are connected to the same antenna and out-of-phase currents when said receivers are connected to different antennas, whereby the difference between said indications is a measure of the phase of the currents in said antennas.

8. A device of the character described in claim 7 which is further characterized in that the indication of in-phase currents is identified by a characteristic mark.

9. The method of indicating the relative phase of currents induced in a pair of spaced antennas by means of a cathode ray tube which comprises deriving currents for rotating said cathode ray from the currents induced in the first of said antennas, deriving first modifying currents from the currents induced in said first antenna for modifying the rotation of said cathode ray, subsequently deriving second modifying currents from currents induced in the second of said antennas, substituting said second modifying currents for said first modifying currents to differently modify said cathode ray by an amount which is a function of the difference in phase between currents induced in said antennas.

WINFIELD R. KOCH.